United States Patent
Trowbridge et al.

(10) Patent No.: US 7,502,798 B2
(45) Date of Patent: Mar. 10, 2009

(54) SYSTEM AND METHOD OF SEARCHING FOR INFORMATION BASED ON PRIOR USER ACTIONS

(75) Inventors: Jon Eric Trowbridge, Chicago, IL (US); Nathaniel Dourif Friedman, Boston, MA (US)

(73) Assignee: Novell, Inc., Provo, UT (US)

( * ) Notice: Subject to any disclaimer, the term of this patent is extended or adjusted under 35 U.S.C. 154(b) by 326 days.

(21) Appl. No.: 11/195,731

(22) Filed: Aug. 3, 2005

(65) Prior Publication Data

US 2007/0033166 A1    Feb. 8, 2007

(51) Int. Cl.
*G06F 17/30* (2006.01)

(52) U.S. Cl. .......................................... 707/10
(58) Field of Classification Search ............ 707/2, 707/3, 10, 104.1
See application file for complete search history.

(56) References Cited

U.S. PATENT DOCUMENTS

| | | | |
|---|---|---|---|
| 4,897,782 A | 1/1990 | Bennett et al. | 364/200 |
| 5,287,504 A | 2/1994 | Carpenter et al. | 395/600 |
| 5,577,241 A | 11/1996 | Spencer | 395/605 |
| 6,081,750 A | 6/2000 | Hoffberg et al. | 700/17 |
| 6,272,455 B1 | 8/2001 | Hoshen et al. | 704/1 |
| 6,272,507 B1 | 8/2001 | Pirolli et al. | 707/513 |
| 6,349,137 B1 | 2/2002 | Hunt et al. | 379/265.06 |
| 6,400,996 B1 | 6/2002 | Hoffberg et al. | 700/83 |
| 6,480,881 B1 | 11/2002 | Kubota et al. | 709/202 |
| 6,647,383 B1 | 11/2003 | August et al. | 707/3 |
| 6,931,593 B1 | 8/2005 | Grooters | 715/717 |
| 7,213,040 B1 | 5/2007 | Stokes et al. | 707/203 |
| 2002/0087649 A1 | 7/2002 | Horvitz | 709/207 |
| 2002/0143860 A1 | 10/2002 | Catan | 709/203 |
| 2002/0147805 A1 | 10/2002 | Leshem et al. | 709/223 |
| 2002/0174134 A1* | 11/2002 | Goykhman | 707/104.1 |
| 2003/0018634 A1 | 1/2003 | Shringeri et al. | 707/4 |
| 2003/0099399 A1 | 5/2003 | Zelinski | 382/186 |
| 2004/0030753 A1 | 2/2004 | Horvitz | 709/206 |
| 2004/0049494 A1 | 3/2004 | Kottisa | 707/3 |
| 2004/0049512 A1 | 3/2004 | Kawakita | 707/100 |
| 2005/0114374 A1 | 5/2005 | Juszkiewicz et al. | 707/101 |
| 2006/0010120 A1 | 1/2006 | Deguchi et al. | 707/4 |
| 2006/0221235 A1 | 10/2006 | Kusumoto | 348/553 |
| 2006/0224938 A1 | 10/2006 | Fikes et al. | 715/500 |
| 2007/0094292 A1 | 4/2007 | Kataoka | 707/102 |

OTHER PUBLICATIONS

Otto Bruggeman, [Patch] kdirwatch.cpp, Sep. 21, 2002, kde-core-devel list http://lists.kde.org/?l=kde-core-devel&m=103265283012353&w=2, 2 pages.

(Continued)

*Primary Examiner*—Etienne P LeRoux
(74) *Attorney, Agent, or Firm*—Pillsbury Winthrop Shaw Pittman LLP

(57) ABSTRACT

The invention is directed to a system and method of observing actions performed on a computer and generating a timeline that includes timeline entries corresponding to the observed actions. During a computer session, the invention searches the timeline and other locations for objects that relate to target objects that are accessed by users and/or presented to users. The search produces search result objects associated with the target objects. The search result objects may be used to conduct additional searches in order to provide more complete search results.

22 Claims, 5 Drawing Sheets

OTHER PUBLICATIONS

Josef Weidendorfer, Re:[Patch] kdirwatch.cpp, Sep. 23, 2002, kde-core-devel list http://lists.kde.org/?l=kde-core-devel&m=103279747704133&w=2, 1 page.

Sven Radej, "class KDirWatch", 2003, <http://api.kde.org/3.1-api/classref/kio/KDirWatch.html>.

Microsoft, Outlook 2003 Screenshots, Copyright 2003, 9 pages.

Corbet, "Watching Filesystem Events with Inotify", Sep. 29, 2004, available online: <http://lwn.net/Articles/104343/>, 5 pages.

* cited by examiner

SYSTEM AND METHOD OF SEARCHING FOR INFORMATION BASED ON PRIOR USER ACTIONS

BACKGROUND

1. Field of the Invention

This invention relates to a system and method of observing actions performed on a computer and processing information that corresponds to the observed actions. In particular, the invention is directed to searching for objects based on information corresponding to the observed actions.

2. Background Information

During the course of a computer session, many actions may be performed on a computer. For several reasons, including increasing workforce productivity, it may be desirable to monitor these actions. Known applications enable monitoring of actions performed on the computer through logging of events, such as keystrokes, web sites visited, emails sent/received, windows viewed, and passwords entered. Known applications further enable capturing of screen shots at scheduled time intervals. Known event monitoring applications are typically run in stealth mode to make them undetectable to users of the monitored computer.

Other known applications enable monitoring of actions performed on the computer through direct monitoring of select types of object-level actions performed using a single application or through direct monitoring of select types of object-level actions performed in a suite of associated applications. Once the select types of object-level actions are logged, they may be displayed.

While known applications present logged events and/or selected types of object-level actions, known applications are deficient at least because they do not monitor and log all types of object-level actions performed across multiple unrelated applications. Additionally, known applications are deficient because they do not identify relationships between the events and/or selected types of object-level actions. For example, known applications do not analyze information associated with each event and/or selected type of object-level action to infer relationships between two or more events and/or two or more objects. Furthermore, known applications are deficient because they do not enable searching for events and/or objects based on the observed actions.

Other drawbacks exist with these and other known applications.

SUMMARY

Various aspects of the invention overcome at least some of these and other drawbacks of known applications. According to one embodiment of the invention, a system is provided that includes at least one client terminal having a processor, a memory, a display and at least one input mechanism (e.g., keyboard or other input mechanism). The client terminal may be connected or connectable to other client terminals via wired, wireless, and/or a combination of wired and wireless connections and/or to servers via wired, wireless, and/or a combination of wired and wireless connections.

Each client terminal preferably includes, or may be modified to include, monitoring software described herein that operates in the background to observe all types of actions performed on the corresponding client terminal. The actions may be associated with objects, including applications, documents, files, email messages, chat sessions, web sites, address book entries, calendar entries or other objects. Objects may include information such as personal information, user data and other information. Other applications may reside on the client terminal as desired.

The actions performed during the computer session may be initiated by users and/or computers. Regarding user initiated actions, users may directly or indirectly access several types of objects during the course of the computer session. According to one embodiment of the invention, users may perform actions through a graphical user interface (GUI) or other interface. According to one embodiment of the invention, user initiated actions may be tracked using triggering events. According to another embodiment of the invention, user initiated actions may be tracked at any level including, for example, the window level and/or other levels. The type of information that corresponds to user initiated actions may include, for example, when objects are opened and closed, when users switch focus between different objects and/or windows, idle times, when users type on a keyboard, when users manipulate a mouse, and other user initiated action information.

Regarding computer initiated actions, computers may directly or indirectly access several types of objects during the course of the computer session. According to one embodiment of the invention, computers may perform actions including generating a reminder, activating a screen saver, initiating an auto save, automatically downloading information from a web site (such as an update file), and performing other computer initiated actions. According to another embodiment of the invention, computer initiated actions may be tracked using triggering events. The type of information that corresponds to computer initiated actions may include, for example, when objects are automatically opened and/or closed, when the screen saver is activated, when an auto save is activated, and other computer initiated action information.

The information corresponding to user initiated actions and computer initiated actions may be displayed according to various configurations. For example, information corresponding to user initiated actions and computer initiated actions may be organized and displayed in a timeline. In one embodiment of the invention, user initiated action information and computer initiated action information may be combined and displayed integrally in a timeline according to user defined configurations. In another embodiment of the invention, user initiated action information and computer initiated action information may be displayed separately according to user defined configurations. According to one embodiment of the invention, information corresponding to the user initiated actions and/or the computer initiated actions may be presented as graphical information through screenshots, charts, and/or other graphical information. According to another embodiment of the invention, information corresponding to the user initiated actions and/or the computer initiated actions may be displayed in a linear format, non-linear format or other format.

According to one embodiment of the invention, a correlation determining system is provided that analyzes information associated with the user initiated actions that relate to these objects. Relationships may be inferred between objects based on a chronological proximity of user initiated actions, a chronological proximity of window focus toggling, or other information. Once relationships are discovered between two or more objects, the strength of the relationships may be determined using a relevance ranking that is based on a variety of factors associated with the user initiated actions and the computer initiated actions. A relationship between objects may be identified if the strength of the relationship is determined to exceed a predefined threshold value.

According to another embodiment of the invention, searches may be performed on objects, which include accessed objects, viewed objects, focused objects, among other objects. The objects may provide a usage history. Information associated with objects may be analyzed and an initial search may be performed against the timeline in order to obtain related objects that correspond to prior user actions. The initial search result objects may be presented to users to enable selection of search result objects for viewing of underlying content and other information. The information corresponding to the search result objects may be analyzed and used to perform an update search on timeline entry objects, client terminal objects, server objects, Internet objects and/or objects located in other locations. The update search result objects may be presented to users to enable selection of update search result objects for viewing of underlying content and other information.

These and other objects, features, and advantages of the invention will be apparent through the detailed description of the embodiments and the drawings attached hereto. It is also to be understood that both the foregoing general description and the following detailed description are exemplary and not restrictive of the scope of the invention. Numerous other objects, features, and advantages of the invention should now become apparent upon a reading of the following detailed description when taken in conjunction with the accompanying drawings, a brief description of which is included below. Where applicable, same features will be identified with the same reference numbers throughout the various drawings.

DETAILED DESCRIPTION

Figure 1:
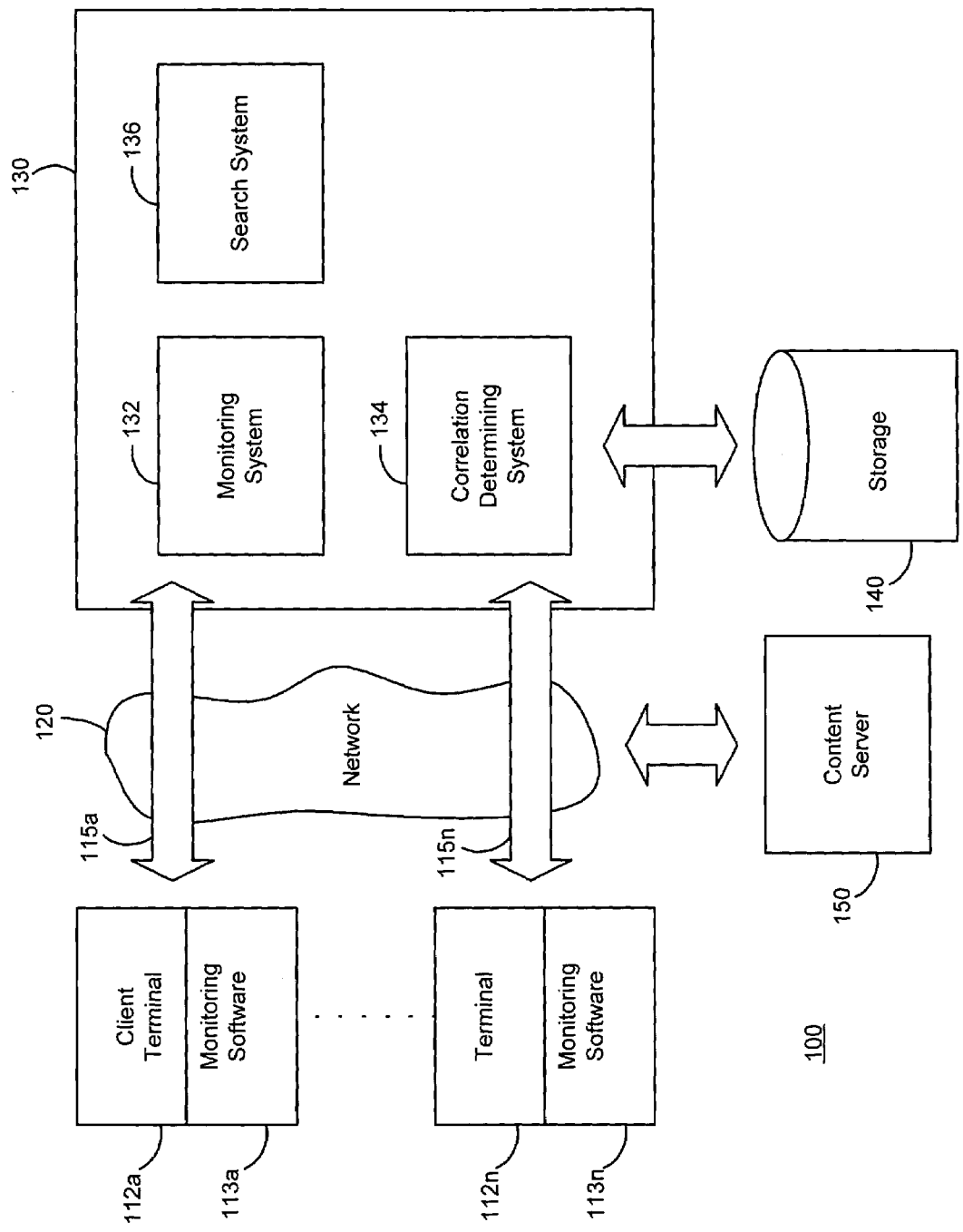
FIG. 1 illustrates an exemplary embodiment of a system diagram according to an embodiment of the invention.

FIG. 1 illustrates an example of the system architecture 100 according to one embodiment of the invention. Client terminals 112a-112n (hereinafter identified collectively as 112) and server(s) 130 may be connected via a wired network, a wireless network, a combination of the foregoing and/or other network(s) (for example the Internet) 120. The system of FIG. 1 is provided for illustrative purposes only and should not be considered a limitation of the invention. Other configurations may be used.

The client terminals 112 may include any number of terminal devices including, for example, personal computers, laptops, PDAs, cell phones, Web TV systems, devices that combine the functionality of one or more of the foregoing or other terminal devices, and various other client terminal devices capable of performing the functions specified herein. According to one embodiment of the invention, users may be assigned to one or more client terminals.

According to one embodiment of the invention, communications may be directed between one client terminal 112 and another client terminal 112 via network 120, such as the Internet. Client terminals 112 may communicate via communications media 115a-115n (hereinafter identified collectively as 115), such as, for example, any wired and/or wireless media. Communications between respective client terminals 112 may occur substantially in real-time if the client terminals 112 are operating online.

According to another embodiment of the invention, communications may be directed between client terminals 112 and content server(s) 150 via network 120, such as the Internet. Client terminals 112 may communicate via communications media 115, such as, for example, any wired and/or wireless media. Communications between client terminals 112 and the content server 150 may occur substantially in real-time if the devices are operating online. One of ordinary skill in the art will appreciate that communications may be conducted in various ways and among other devices.

Communications via network 120, such as the Internet, may be implemented using current and future language conventions and/or current and future communications protocols that are generally accepted and used for generating and/or transmitting messages over the network 120. Language conventions may include Hypertext Markup Language ("HTML"), extensible Markup Language ("XML") and other language conventions. Communications protocols may include, Hypertext Transfer Protocol ("HTTP"), TCP/IP, SSL/TLS, FTP, GOPHER, and/or other protocols.

According to one embodiment of the invention, client terminals 112 may include, or be modified to include, corresponding monitoring software 113a-113n (hereinafter identified collectively as 113) that may operate in the background to observe all types of actions performed on the corresponding client terminal 112. The types of actions performed on the corresponding client terminal 112 may be monitored for any applications accessed through the client terminal. The actions may be associated with objects, including applications, documents, files, email messages, chat sessions, web sites, address book entries, calendar entries or other objects. The objects may include information such as personal information, user data, or other information. According to one embodiment of the invention, monitoring software 113 may include client-side monitoring software. According to another embodiment of the invention, monitoring software 113 may include server-side monitoring software, such as monitoring system 132 that resides on server 130. Agents may be placed on the client terminal 112 to communicate information between monitoring system 132 and the client terminal 112. One of ordinary skill in the art will appreciate that other configurations may be available for deploying the monitoring software 113.

The actions performed during the computer session may be initiated by users and/or computers. Regarding user initiated actions, users may directly or indirectly access several types of objects during the course of the computer session. According to one embodiment of the invention, users may perform actions through a graphical user interface (GUI) or other interface. According to one embodiment of the invention, user initiated actions may be tracked using triggering events, including application level activity, user actions performed on objects, a user's activity focus, and/or other triggering events. According to another embodiment of the invention, user initiated actions may be tracked at any level including, for example, the window level and/or other levels. The type of information that corresponds to user initiated actions may include, for example, when objects are opened and closed, when users switch focus between different objects and/or windows, idle times, when users type on a keyboard, when users manipulate a mouse, and/or other user initiated action information.

Regarding computer initiated actions, computers may directly or indirectly access several types of objects during the course of the computer session. According to one embodiment of the invention, computers may perform actions including generating a reminder, activating a screen saver, initiating an auto save, automatically downloading information from a web site (such as an update file), and performing other computer initiated actions. According to one embodiment of the invention, computer initiated actions may be tracked using triggering events including, for example, launching of a screen saver, initiating an auto save, and/or other triggering events. The type of information that corresponds to computer initiated actions may include, for example, when objects are automatically opened and/or closed, when the screen saver is activated, when an auto save is activated, and other computer initiated action information.

According to one embodiment of the invention, the monitoring software 113 may operate undetected by the user. For example, the monitoring software 113 may be transparent to the user and may not appear in the windows task manager, in the registry, startup utilities, and/or other visible locations. In another embodiment of the invention, the monitoring software 113 may operate undetected by the user, but the results may be viewed on demand by users. In yet another embodiment of the invention, the monitoring software 113 may operate with user awareness. One of ordinary skill in the art will readily appreciate that other implementations may be used to monitor and/or view results associated with the observed actions.

According to another embodiment of the invention, the monitoring software 113 may gather information associated with the observed user initiated actions and/or computer initiated actions according to several techniques. In one embodiment of the invention, the information may be gathered using direct observation. For example, the information may be gathered by directly observing a window-based system for tracking information including, for example, tracking when windows appear and/or disappear from the graphical user interface, tracking which window on the GUI is focused, and other tracking information. In another embodiment of the invention, the information may be gathered by directly observing the windows-based system and mapping windows back to the associated applications, among other mapping information. In yet another embodiment of the invention, the information may be gathered by directly observing the windows-based system to monitor when the client terminal is actively being used or sitting idle, among other status information.

In an alternative embodiment of the invention, the monitoring software 113 may operate in a mode that gathers information associated with the observed user initiated actions and/or computer initiated actions by configuring other applications to broadcast action information. According to one exemplary embodiment of the invention, the monitoring software 113 may configure a browser application or other application to generate and send messages, such as a time-stamped message or other identifying messages, that inform the monitoring software 113 of the action being implemented by the browser such as, for example, "opening a website in window 12345," among other actions. One of ordinary skill in the art will readily appreciate that other techniques may be used to gather information associated with the observed user initiated actions and/or computer initiated actions.

According to one embodiment of the invention, information corresponding to user initiated actions and computer initiated actions may be processed in real-time or may be stored for subsequent processing. Storage 140, or other storage device, may be used to store the user initiated actions and computer initiated actions, among other data.

According to another embodiment of the invention, separate applications may be used to monitor and organize the gathered information. For example, a first application may be used to gather information according to one or more of the direct observation monitoring technique, the application configuration monitoring technique and other monitoring techniques. A second application may be used to organize the information associated with all of the observed types of actions including, for example, collating and chronologically organizing records of the observed actions, generating any user-defined listing of information corresponding to the observed actions, or applying any other organizing techniques. The separate applications may be embodied in the monitoring software 113, the monitoring system 132, or a combination thereof, among other configurations. One of ordinary skill in the art will readily appreciate that several configurations may be used to monitor and/or organize information associated with all the observed types of actions.

According to another embodiment of the invention, a single application may be used to monitor and organize the gathered information. For example, a single application may include both an observer component that gathers information corresponding to actions that are performed on a computer and an information organizing component, among other components. For example, the single application may be configured to observe and organize user initiated actions associated with objects including, for example, opening/closing objects, switching between objects/windows, and other user initiated actions. The single application may also observe and organize computer initiated actions including, for example, generating a reminder, creating new windows, activating a screen saver, initiating idle time, generating focus-level information, generating application-level information (i.e., opening an application and closing it), and/or other computer initiated actions. The single application may be embodied in the monitoring software 113, the monitoring system 132, or a combination thereof, among other configurations.

Figure 2:
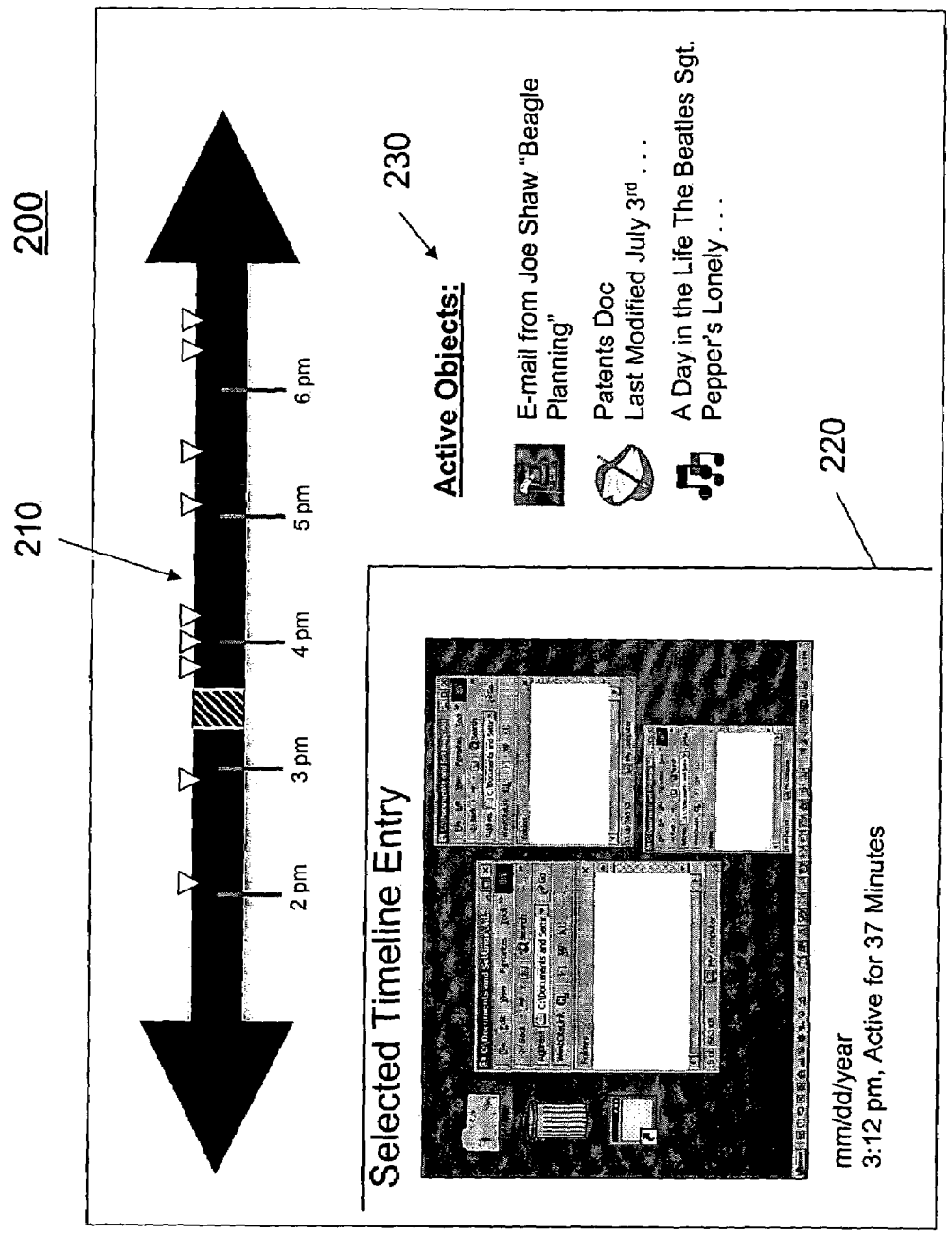
FIG. 2 illustrates an exemplary embodiment of a timeline according to an embodiment of the invention.

The information corresponding to user initiated actions and computer initiated actions may be displayed according to various configurations. As illustrated in FIG. 2, information corresponding to user initiated actions and computer initiated actions may be organized and displayed in a timeline 210. For example, timeline 210 may be arranged to include object entries that are organized in chronological time order. Display 200 may include a display portion 220 that illustrates the content of object entries, wherein the content may include information such as, screenshots, dates that objects are accessed, times that objects are accessed, lengths of time that objects are active, and/or other information. Display 200 may also include a portion 230 that lists active objects. In another embodiment of the invention, information may be organized and displayed according to other configurations.

In one embodiment of the invention, user initiated action information and computer initiated action information may be combined and displayed integrally in a timeline according to user defined configurations. In another embodiment of the invention, user initiated action information and computer initiated action information may be displayed separately according to user defined configurations. Regarding the separate display of user initiated action information and computer initiated action information, a first timeline may be provided that displays user initiated actions according to a first user defined configuration. A second timeline may be provided that displays computer initiated actions according to a second user defined configuration. According to another embodiment of the invention, information corresponding to the user initiated actions and/or the computer initiated actions may be displayed in a non-linear format or other format. One of ordinary skill in the art will appreciate that various configurations may be provided for organizing and/or displaying the information corresponding to the user initiated actions and the computer initiated actions.

According to one embodiment of the invention, information corresponding to the user initiated actions and/or the computer initiated actions may be presented as graphical information through screenshots, charts, and/or other graphical information. Graphical information may be associated with objects and may be displayed with corresponding objects. The graphical information may be captured using triggering events associated with the user initiated actions and/or computer initiated actions, including application level changes, active window title bars changes, window focus changes, and/or other triggering events. In one exemplary embodiment of the invention, the graphical information may include a screenshot that captures GUI content as presented to the user.

According to one embodiment of the invention, users may be assigned to several client terminals 112. Thus, one or more monitoring applications 113 may be associated with users. According to another embodiment of the invention, a roaming monitoring application may be assigned to users that enables one monitoring application to operate on several client devices. The timeline associated with a selected user may include an aggregate timeline that organizes and displays information provided from one or more client terminals 112 that are associated with the selected user. Alternatively, several timelines may be associated with the selected user and may be separately displayed. One of ordinary skill in the art will readily appreciate that other techniques may be used to monitor and/or view results associated with one or more client terminals.

Figure 3:
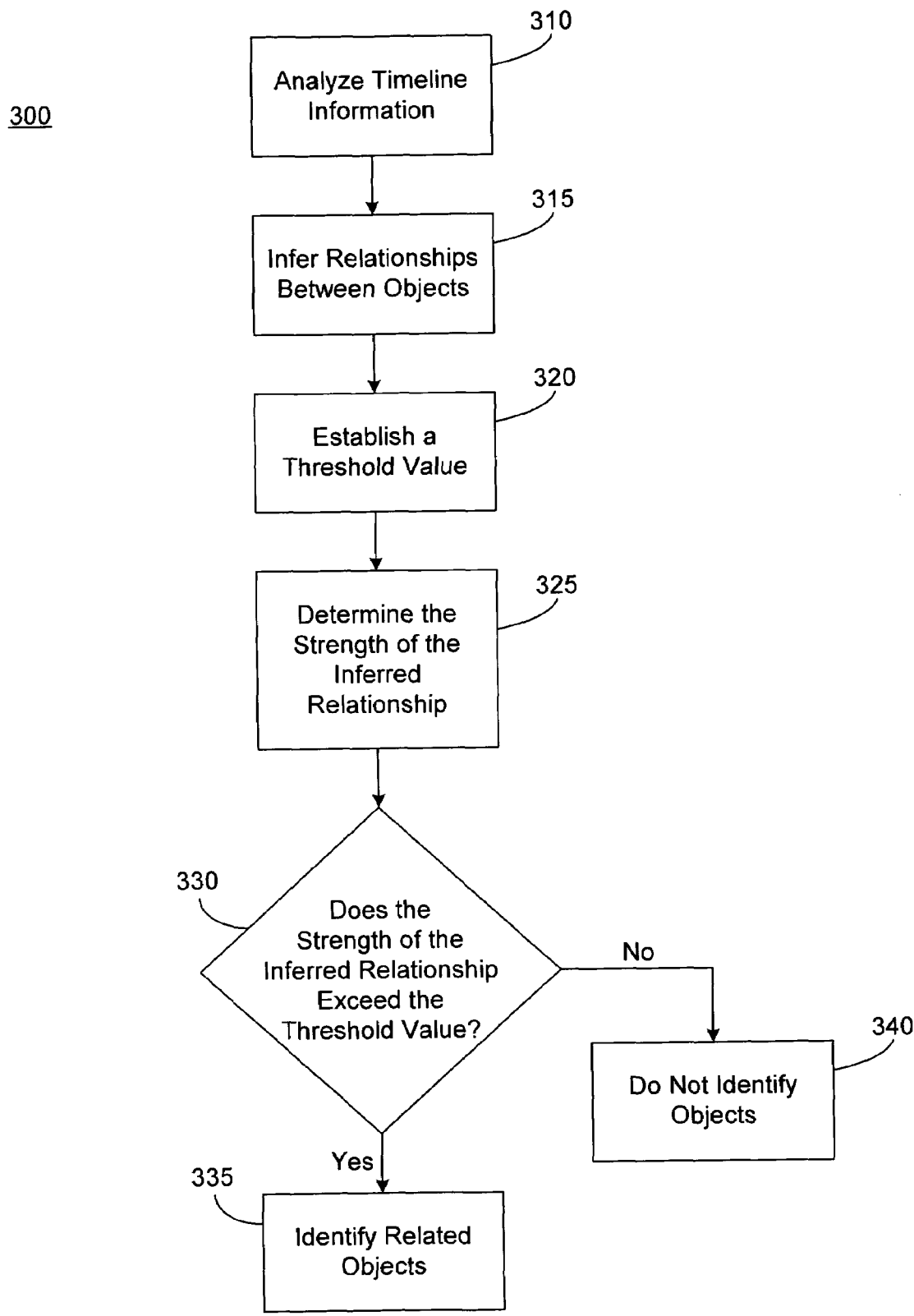
FIG. 3 illustrates a flow chart schematic for analyzing relationships between objects according to an embodiment of the invention.

According to another embodiment of the invention, information corresponding to user initiated actions and computer initiated actions may be analyzed by correlation determining system 134. FIG. 3 illustrates a flow diagram 300 of a generalized method for determining whether relationships exist between objects. In operation 310, timeline information is analyzed. For example, timeline information may be analyzed to discover that a first object (i.e., an email message) was opened, followed by the opening of a second object (i.e., a word processing application), followed by the opening and modification of a third object (i.e., a word processing document). According to another embodiment of the invention, correlation determining system 134 may analyze parameters derived from information associated with the user initiated actions relating to these objects including, for example, a temporal order in which the objects are accessed, focus toggling between the first object and the third object, opening the first object contemporaneously with the third object, or other user initiated actions, to infer relationships between objects. One of ordinary skill in the art will readily appreciate that other techniques may be used to infer relationships between objects.

In operation 315, relationships may be inferred between objects based on a chronological proximity of user initiated actions, a chronological proximity of window focus toggling, or other time-based information. Other types of information may be analyzed to infer relationships between objects. One of ordinary skill in the art will readily appreciate that relationships between objects may be inferred by analyzing one or more different parameters derived from common information that corresponds to user initiated actions and/or computer initiated actions.

According to an alternative embodiment of the invention, information corresponding to user initiated actions including, for example, a temporal proximity in which users access two or more objects, a temporal proximity in which users create two or more objects, a temporal proximity in which users edit two or more objects, operations that users conduct in close time proximity, or other information corresponding to user initiated action information, may be used to infer relationships between two or more objects. According to yet another embodiment of the invention, various known statistical methods may be used to infer relationships between two or more objects.

In operation 320, a threshold value may be established. Once relationships are discovered between two or more objects, the strength of the relationships may be determined in operation 325 using a relevance ranking that is based on a variety of factors associated with the user initiated actions and the computer initiated actions. According to one embodiment of the invention, the relevance may be provided with a value based on factors including, for example, a frequency of the user initiated actions, simultaneous/sequential occurrence of user initiated action, a duration of user initiated actions, overall chronological proximity of user initiated actions, and/or other factors.

In operation 330, the strength of the relationships derived from the factors may be compared to the threshold value. In operation 335, relationships between objects may be identified if the strength of the relationship is determined to exceed a predefined threshold value. Alternatively, in step 340, relationships between objects may not be identified if the strength of the relationship is determined to be below a predefined threshold value. One of ordinary skill in the art will readily appreciate that other techniques may be used to determine the strength of relationships between objects. According to another embodiment of the invention, correlation determining system 134 may analyze parameters derived from information associated with user initiated actions and/or computer initiated actions to discover relationships between objects.

Figure 4:
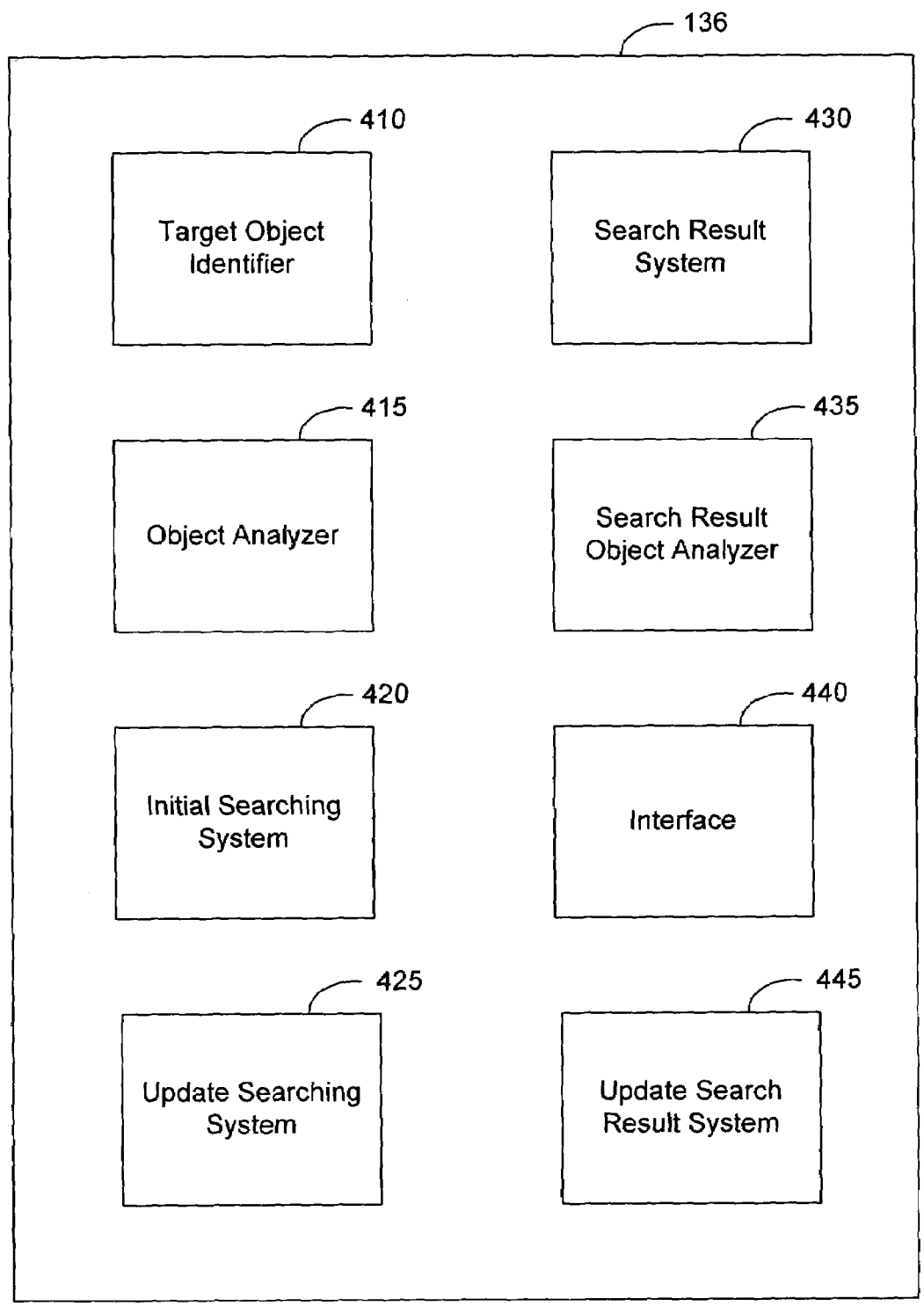
FIG. 4 illustrates an exemplary embodiment of search system according to an embodiment of the invention.

As illustrated in FIG. 4, a search system 136 is provided that includes a target object identifier 410 that is configured to identify target objects. An object analyzer 415 is provided that analyzes information associated with the target objects, wherein the information includes user initiated action information and/or computer initiated action information. An initial searching system 420 is configured to search timeline entry objects based on the user initiated action information and/or the computer initiated action information. An update searching system 425 performs an update search based on information associated with the search result objects. A search result system 430 is provided to generate search result objects based on inferred relationships that satisfy a predetermined criteria. A search result object analyzer 435 is provided to analyze information associated with the search result objects. An interface 440 may include a video monitor or other device for displaying information. An update search result system 445 is provided to generate update search result objects. While separate components are illustrated, one of ordinary skill in the art will readily appreciate that one or more components may be configured to perform these functions and that the functions may be performed using software or hardware components.

Figure 5:
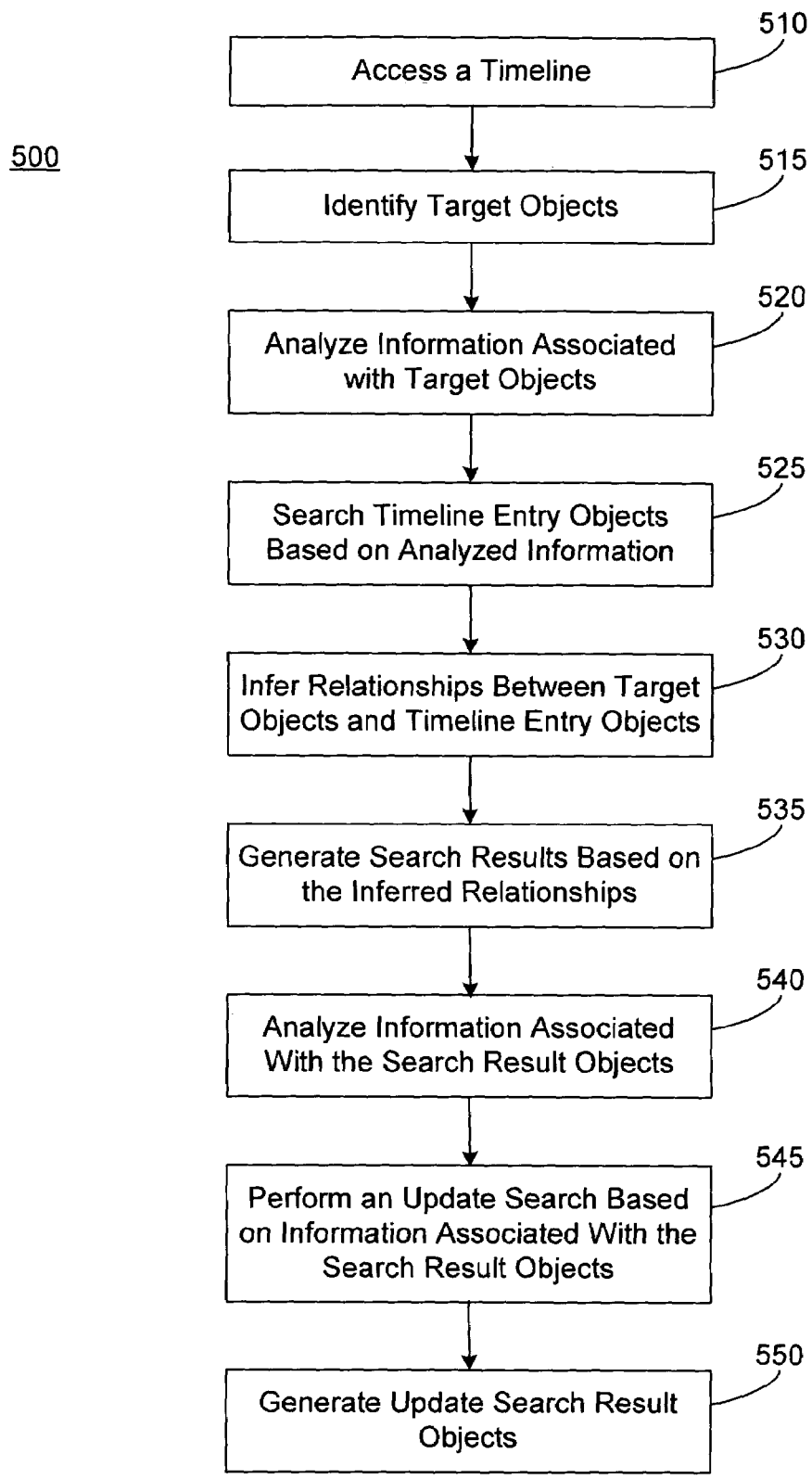
FIG. 5 illustrates a flow chart schematic for performing searches according to an embodiment of the invention.

FIG. 5 illustrates a flow diagram 500 for a generalized method of performing a search. In operation 510, a timeline is accessed. In operation 515, target objects are identified, including computer initiated objects, such as reminders or other target objects, and/or user initiated objects, such as objects that users are accessing, viewing, focusing on, interacting with, or other target objects. In operation 520, information associated with the target objects may be analyzed, wherein the information includes user initiated action information and computer initiated action information. A search may be conducted for objects that relate to the target objects, wherein the search may include timeline entry objects, client terminal objects, server objects, Internet objects and/or objects located in other locations. According to one embodiment of the invention, the searches may be performed automatically for target objects and may be triggered by user initiated actions, including toggling between objects, accessing objects and/or other user initiated actions. Additionally, the searches may be performed automatically for target objects and may be triggered by computer initiated actions, including presenting a calendar reminder and/or other computer initiated actions. Alternatively, the searches may be user initiated and may be based on search queries that are submitted to the system. In one embodiment of the invention, the searches may be performed in real-time.

According to another embodiment of the invention, object searching may be conducted using content-based information, context-based information, information associated with user initiated actions and/or computer initiated actions, and/or other searchable information. User/computer initiated action-based object searching may be conducted using time associations, context associations, or other non-content associations. Additionally, user/computer initiated action-based object searching may be conducted using content associations. In operation 530, search system 136 may communicate with correlation determining system 134 to request searching of timeline information for identifying relationships between target objects and timeline entry objects, among other objects. One of ordinary skill in the art will readily appreciate that other techniques may be used to search for objects.

According to one embodiment of the invention, search system 136 may discover content-based relationships between target objects and other objects. Based on the content relationships, search system 136 may communicate the search results to correlation determining system 134 to enable update searching using the timeline entry objects. The search by correlation determining system 134 provides users with timeline entry objects that are associated with past user actions and therefore may be highly relevant to the search. In operation 535, the search results, including the timeline entry objects, may be generated and provided if a threshold value is satisfied, as discussed above. In operation 540, information associated with the search results may be analyzed. In one embodiment, an initial search may be performed using content-based object searching to discover one or more timeline entry objects. In operation 545, update searches may be performed to find information associated with the search result objects. In one embodiment, the update searches may be performed using, for example, non-content associations, including time associations, context associations, or other non-content associations to discover one or more timeline entry objects. In another embodiment, the update searches may be performed using content associations. In operation 550, update search result objects may be generated.

In one exemplary embodiment, the user may participate in an online chat session with an expert that is sponsored by a local newspaper. During the chat session, the expert may announce that she will be conducting a follow-up chat session to be held at some time in the future. The user may reserve the date by creating a calendar entry during the chat session using a generic entry such as "Participate in a follow-up online chat with chronicle guru," rather than creating a more descriptive entry of "Participate in a follow-up online chat with Jane Doe." Creating the calendar entry is a user initiated action and may be saved in timeline as a calendar object.

Based on the favorable experience with the online expert, the user may participated in additional online chat sessions and follow-up chat session with other experts and again create generic calendar entries, such as "Participate in a follow-up online chat with chronicle guru." Creating the additional calendar entry is another user initiated action and may be saved as a calendar object in the timeline.

Several months later, when the calendar reminder associated with the first calendar object pops-up on the GUI, the description "Participate in a follow-up online chat with chronicle guru," may appear in the subject line. The user, however, may not remember that Jane Doe is the expert conducting the follow-up chat session. Using known systems, a content-based search may be conducted on the words "chronicle guru" to locate the multiple calendar entries that include the words "chronicle guru". However, the calendar entries may not provide relevant information regarding the identify of the "chronicle guru."

According to one embodiment of the invention, when the calendar reminder is presented, a search may be automatically conducted on timeline object entries. The automatic search may be triggered by the launching of the calendar reminder, which is a computer initiated action. Alternatively, the user may elect to manually conduct the search. Based on searching timeline, the "chat session with Jane Doe" object that corresponds to the "chronicle guru" calendar object may be identified through the time-based association.

According to another embodiment of the invention, the results of the search associated with the "chat session with Jane Doe" object may be displayed to the user. The search result objects may be displayed according to various configurations. For example, the search results may be displayed in a separate window, a same window as the reminder, or according to other configurations. By selecting search result objects including, for example, clicking on the search result objects or using another selection method, the user may view information relating to the selected objects. For example, the user may select the "chat session with Jane Doe" object to view content of the chat session with Jane Doe. Content and other information may be selected and viewed for other search result objects.

According to another embodiment of the invention, information or clues, may be extracted from the search result objects and may be used to generate additional searches on timeline entry objects, client terminal objects, server objects, Internet objects and/or objects located in other environments. In one embodiment of the invention, the additional search may be automatically conducted and triggered by the user initiated action of selecting the search result or by other user/computer initiated actions. Alternatively, the user may elect to manually conduct the additional search. According to one embodiment of the invention, a search of the client terminal, Internet, server, or other locations may be performed for topics extracted from the search result objects. For the example discussed above, the Internet may be searched for "Jane Doe," the subject of the chat session or other information.

According to one embodiment of the invention, the results of the additional search may be displayed to the user. The additional search result objects may be displayed according to various configurations. For example, the additional search results may be displayed in a separate window, a same window as the reminder, or according to other configurations. By selecting objects corresponding to the additional search including, for example, clicking on the additional search result objects or using another selection method, the user may view information relating to the selected additional search result objects. According to another embodiment of the invention, further searches may be conducted on timeline entry objects, client terminal objects, server objects, Internet objects and/or objects located in other environments, based on the results of the additional search.

The foregoing presentation of the described embodiments is provided to enable any person skilled in the art to make or use the invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, as a firmware program loaded into non-volatile storage or a software program loaded from or into a data storage medium as machine-readable code, such code being instructions executable by an array of logic elements such as a microprocessor or other digital signal processing unit, or may include other implementations.

Embodiments of the invention include a computer program containing one or more sequences of machine-readable instructions describing a method as disclosed above, or a data storage medium (e.g. semiconductor memory, magnetic or optical disk) having such a computer program stored therein. The invention is not intended to be limited to the embodiments provided above, but rather is to be accorded the widest scope consistent with the principles and novel features disclosed in any fashion herein. The scope of the invention is to be determined solely by the appended claims.

What is claimed is:

1. A method of searching for objects that relate to target objects, comprising:
    accessing a timeline that includes objects corresponding to user initiated actions and computer initiated actions;
    identifying target objects;
    analyzing information associated with the target objects, wherein the information includes user initiated action information or computer initiated action information;
    searching timeline entry objects based on the user initiated action information or the computer initiated action information;
    inferring relationships between the target objects and the timeline entry objects based on the analyzed information;
    generating search result objects based on inferred relationships that satisfy a predetermined criteria;
    analyzing information associated with the search result objects;
    performing an update search based on information associated with the search result objects; and
    generating update search result objects.

2. The method according to claim 1, wherein the user initiated action information or the computer initiated action information are associated with corresponding user initiated actions or computer initiated actions.

3. The method according to claim 1, wherein the objects include (i) applications, (ii) documents, (iii) files, (iv) electronic mail messages, (v) chat sessions, (vi) web sites, (vii) address book entries, (viii) calendar entries or any combination of (i) to (viii).

4. The method according to claim 3, wherein the target objects include accessed objects, viewed objects, and focused objects.

5. The method according to claim 1, wherein the timeline entry objects are organized in a chronological order.

6. The method according to claim 1, wherein the searching timeline entry objects and inferring relationships for the target objects are automatically triggered by user initiated actions and computer initiated actions.

7. The method according to claim 1, further comprising displaying (i) the search result objects, (ii) the update search result objects, or any combination of (i) and (ii) on a graphical user interface.

8. The method according to claim 1, wherein the update search is performed on (i) timeline entry objects, (ii) client terminal objects, (iii) server objects, (iv) Internet objects, or any combination of (i) to (iv).

9. The method according to claim 1, wherein searching timeline entry objects includes (i) time association-based searching, (ii) context association-based searching, (iii) content-based searching or any combination of (i) to (iii).

10. The method according to claim 1, wherein performing the update search includes performing (i) content-based searching, (ii) context-based searching, (iii) user initiated action-based searching, (iv) computer initiated action-based searching or any combination of (i) to (iv).

11. The method of claim 1, wherein the inferring relationships between the target objects and the timeline entry objects based on analyzed information comprises inferring relationships based on one or more of: chronological proximity of user-initiated actions; chronological proximity of window focus toggling, temporal proximity in which users access two or more objects, temporal proximity in which users create two or more objects, or temporal proximity in which users edit two or more objects.

12. A system that searches for objects that relate to target objects, comprising:
    a monitoring system that creates a timeline including objects corresponding to user initiated actions and computer initiated actions;
    a target object identifier that is configured to identify target objects;
    an object analyzer that analyzes information associated with the target objects, wherein the information includes user initiated action information or computer initiated action information;
    an initial searching system that searches timeline entry objects based on the user initiated action information or the computer initiated action information;
    a correlation determining system that infers relationships between the target objects and the timeline entry objects based on the analyzed information;
    a search result system that generates search result objects based on inferred relationships that satisfy a predetermined criteria;
    a search result object analyzer that analyzes information associated with the search result objects;
    an update searching system that performs an update search based on information associated with the search result objects; and
    an update search result system that generates update search result objects.

13. The system according to claim 12, wherein the user initiated action information or the computer initiated action information are associated with corresponding user initiated actions or computer initiated actions.

14. The system according to claim 12, wherein the objects include (i) applications, (ii) documents, (iii) files, (iv) electronic mail messages, (v) chat sessions, (vi) web sites, (vii) address book entries, (viii) calendar entries or any combination of (i) to (viii).

15. The system according to claim 14, wherein the target objects include accessed objects, viewed objects, and focused objects.

16. The system according to claim 12, wherein the timeline entry objects are organized in a chronological order.

17. The system according to claim 12, wherein the search by the initial searching system and the inferring of relationships by the correlation determining system are automatically triggered by user initiated actions and computer initiated actions.

18. The system according to claim 12, further comprising an interface that displays (i) the search result objects, (ii) the update search result objects, or any combination of (i) and (ii) on a graphical user interface.

19. The system according to claim 12, wherein the update search is performed on (i) timeline entry objects, (ii) client terminal objects, (iii) server objects, (iv) Internet objects, or any combination of (i) to (iv).

20. The system according to claim 12, wherein searching timeline entry objects includes (i) time association-based searching, (ii) context association-based searching, (iii) content-based searching or any combination of (i) to (iii).

21. The system according to claim 12, wherein performing the update search includes performing (i) content-based searching, (ii) context-based searching, (iii) user initiated action-based searching, (iv) computer initiated action-based searching or any combination of (i) to (iv).

22. The system of claim 12, wherein the correlation determining system infers relationships between the target objects and the timeline entry objects based on one or more of: chronological proximity of user-initiated actions; chronological proximity of window focus toggling, temporal proximity in which users access two or more objects, temporal proximity in which users create two or more objects, or temporal proximity in which users edit two or more objects.

* * * * *